United States Patent
LeMieux

(10) Patent No.: US 7,198,134 B2
(45) Date of Patent: Apr. 3, 2007

(54) METHOD AND APPARATUS FOR ASSISTING MULTIPLE CLIMBERS

(75) Inventor: David Lawrence LeMieux, Tehachapi, CA (US)

(73) Assignee: General Electric Company, Schenectady, NY (US)

( * ) Notice: Subject to any disclaimer, the term of this patent is extended or adjusted under 35 U.S.C. 154(b) by 219 days.

(21) Appl. No.: 10/867,323

(22) Filed: Jun. 14, 2004

(65) Prior Publication Data

US 2005/0274570 A1   Dec. 15, 2005

(51) Int. Cl.
*A47L 3/04* (2006.01)
(52) U.S. Cl. .................. 182/8; 182/3; 182/5; 182/133; 182/147
(58) Field of Classification Search ............. 182/8, 182/147, 241, 230, 5, 10, 11, 133, 3
See application file for complete search history.

(56) References Cited

U.S. PATENT DOCUMENTS

| | | | | |
|---|---|---|---|---|
| 481,252 A | * | 8/1892 | Brainard | 182/6 |
| 732,808 A | * | 7/1903 | Yeager et al. | 182/141 |
| 936,193 A | * | 10/1909 | Turner | 182/18 |
| 1,849,725 A | * | 3/1932 | Quick | 182/10 |
| 2,538,904 A | * | 1/1951 | Herod | 182/8 |
| 4,090,584 A | * | 5/1978 | Wagner | 182/5 |
| 4,252,214 A | | 2/1981 | Miller | |
| 4,458,781 A | * | 7/1984 | Ellis et al. | 182/5 |
| 4,538,703 A | | 9/1985 | Ellis et al. | |
| 4,550,804 A | | 11/1985 | Bummer | |
| 4,997,064 A | | 3/1991 | Motte et al. | |
| 5,161,639 A | | 11/1992 | Ice | |
| 6,390,952 B1 | * | 5/2002 | Wilson | 482/37 |

* cited by examiner

*Primary Examiner*—Richard E. Chilcot, Jr.
*Assistant Examiner*—Lindsay M. Maguire
(74) *Attorney, Agent, or Firm*—James E. McGinness, Esq.; Armstrong Teasdale LLP

(57) ABSTRACT

A method is provided for assisting multiple climbers in ascending and descending the same ladder using an apparatus that includes a plurality of counterweights and a rigging system coupled to the counterweights, the rigging system includes at least two subsystems, each subsystem includes at least one cable, at least one pulley, and at least one harness. The method includes configuring a first subsystem to assist a first climber in ascending and descending the ladder, configuring a second subsystem to assist a second climber in ascending and descending the ladder, coupling a first harness to the first climber, coupling a second harness to the second climber, using the first subsystem to assist the first climber in ascending and descending the ladder, and using the second subsystem to assist the second climber in ascending and descending the ladder.

22 Claims, 4 Drawing Sheets

METHOD AND APPARATUS FOR ASSISTING MULTIPLE CLIMBERS

BACKGROUND OF THE INVENTION

This invention relates generally to climbing assist methods and apparatus and more particularly to methods and apparatus for assisting multiple climbers in ascending and descending a ladder.

Various climbing assist devices are used to assist personnel in climbing ladders over extended distances and to assure their safety in the event of a fall. At least some known climb assist devices include a counterweight to assist personnel in climbing to the desired height and apparatus to control the climbers descent or escape particularly if the climber should accidentally slip or fall from the ladder. However, oftentimes multiple personnel are required to ascend a wind turbine for maintenance, observation, and the like. Climbing assist devices of the kind presently in use have not previously provided climbing assistance to multiple personnel.

BRIEF DESCRIPTION OF THE INVENTION

In one aspect, a method is provided for assisting multiple climbers in ascending and descending the same ladder using an apparatus including a plurality of counterweights and a rigging system coupled to the counterweights. The rigging system includes at least two subsystems, each subsystem including at least one cable, at least one pulley, and at least one harness. The method includes configuring a first subsystem to assist a first climber in ascending and descending the ladder, configuring a second subsystem to assist a second climber in ascending and descending the ladder, coupling a first harness to the first climber, coupling a second harness to the second climber, using the first subsystem to assist the first climber in ascending and descending the ladder, and using the second subsystem to assist the second climber in ascending and descending the ladder.

In another aspect, an apparatus is provided. The apparatus includes a plurality of counterweights, and a rigging system for enabling multiple climbers to ascend and descend the same ladder. The rigging system includes at least two subsystems. Each subsystem includes at least one cable, at least one pulley, and at least one harness, such that each subsystem is configured to function independently of the other subsystem.

In a further aspect, a rigging system for enabling multiple climbers to ascend and descend the same ladder of a structure is provided. The rigging system includes a first subsystem that includes at least one first subsystem cable, at least one first subsystem pulley, and a first subsystem harness. The at least one first subsystem cable includes a first end and a second end, wherein the first end is coupled to a first counterweight, and wherein the second end is coupled to the first subsystem harness. The at least one first subsystem cable is coupled to at least one first subsystem pulley, and the first subsystem harness is coupled to a first climber. The rigging system also includes a second subsystem that includes at least one second subsystem cable, at least one second subsystem pulley, and a second subsystem harness. The at least one second subsystem cable includes a first end and a second end, wherein the first end is coupled to a second counterweight, and wherein the second end is coupled to the second subsystem harness. The at least one second subsystem cable is coupled to at least one second subsystem pulley, and the second subsystem harness is coupled to a second climber.

DETAILED DESCRIPTION OF THE INVENTION

Figure 1:
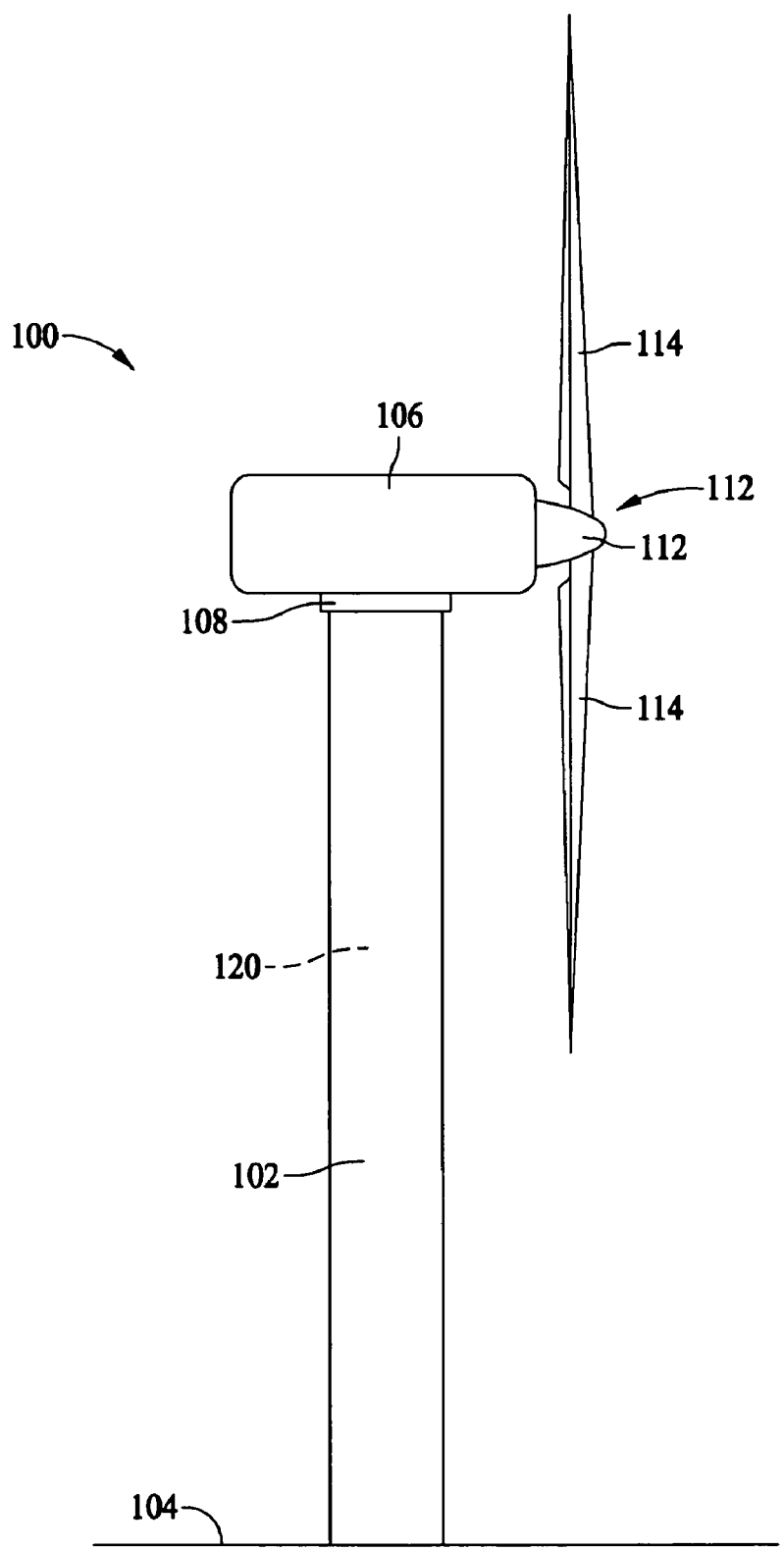
FIG. 1 is a side elevational view of a wind turbine.

FIG. 1 is a side elevational view of a wind turbine 100, such as, for example, a horizontal axis wind turbine. Wind turbine 100 includes a tower 102 extending from a supporting surface 104, a nacelle 106 mounted on a first end 108 of tower 102, and a rotor 110 coupled to nacelle 106. Rotor 110 includes a hub 112 and a plurality of rotor blades 114 coupled to hub 112. In the exemplary embodiment, tower 102 is fabricated from tubular steel and includes a cavity 120 extending between supporting surface 104 and nacelle 106. Alternatively, tower 102 may be, for example, a lattice tower. It is appreciated, however, that the benefits and advantages of the invention may occur in a variety of structures, such as wind turbine 100, that have an elevated portion requiring access by service personnel, or the like. As such, while the invention is described and illustrated in the context of wind turbine 100, the invention is not intended to be limited thereto. It is recognized that the invention can be utilized in a variety of structures and for a variety of applications.

Figure 2:
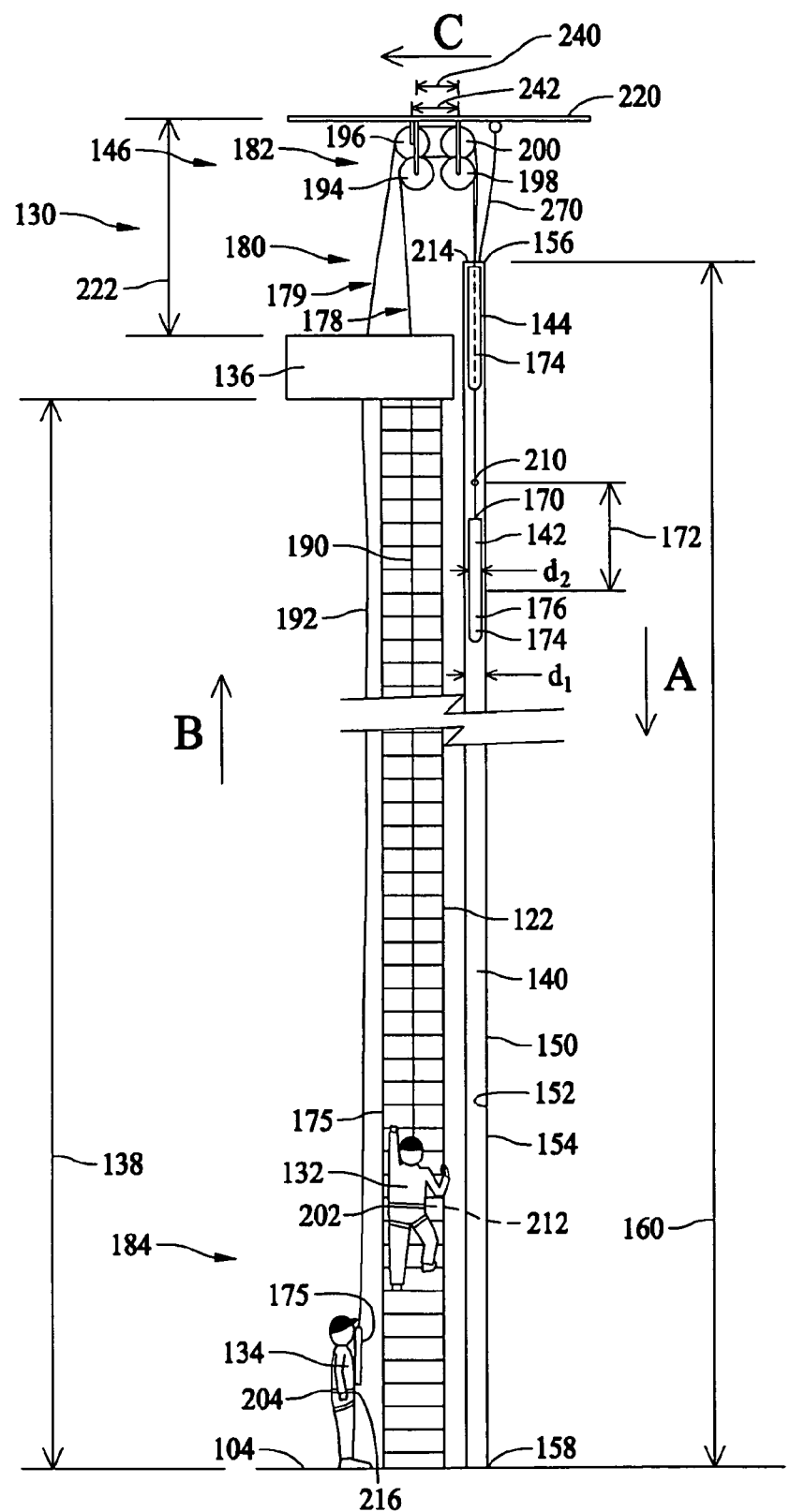
FIG. 2 is a front elevational view of a ladder and an exemplary tower climb assist assembly that can be used with the wind turbine shown in FIG. 1.
Figure 3:
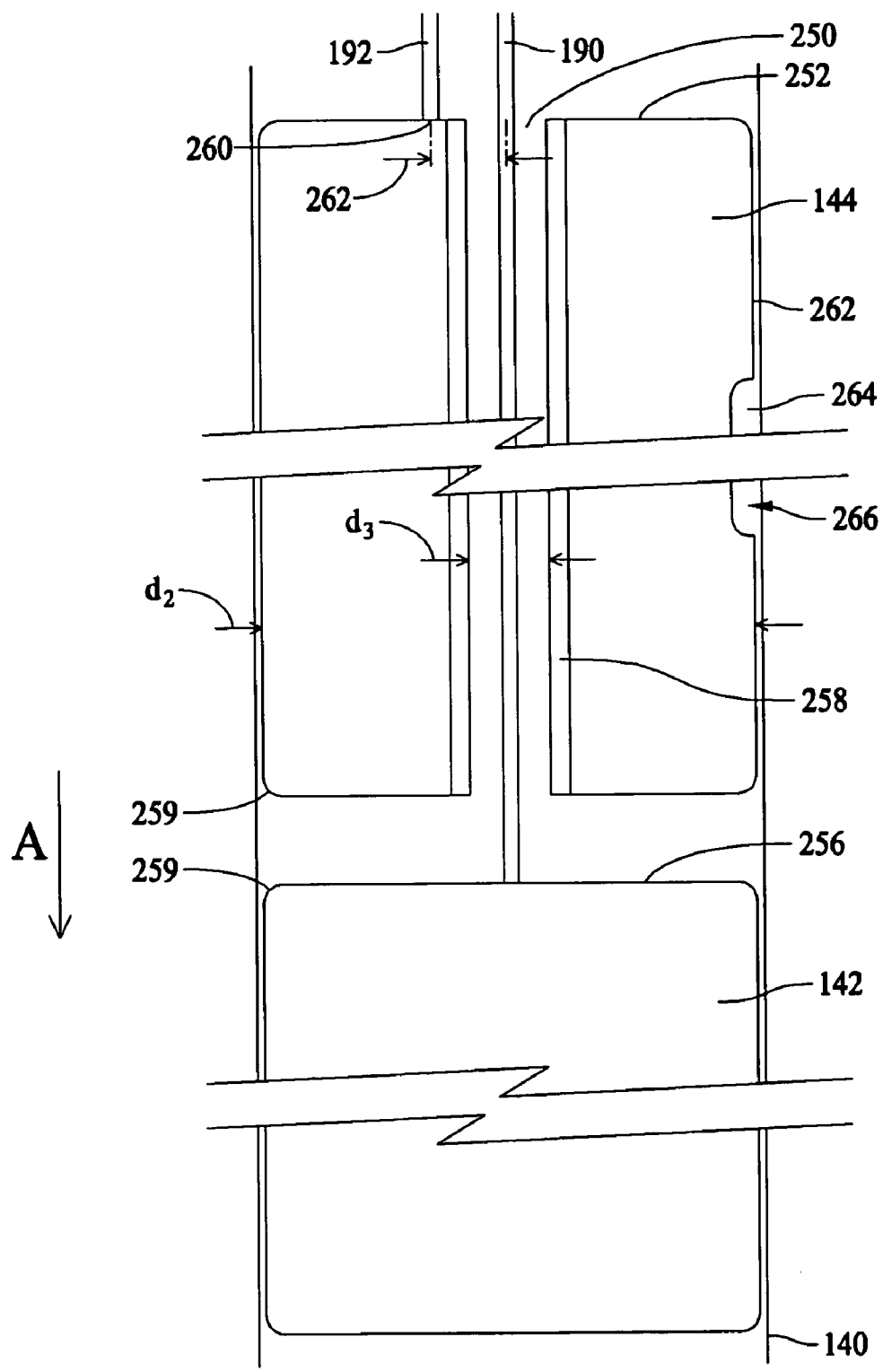
FIG. 3 is a perspective view of a portion of the tower climb assist assembly shown in FIG. 2.

FIG. 2 is a front elevational view of a ladder 122 and a tower climb assist assembly 130 useable by a first climber 132 and a second climber 134 to climb a structure, such as wind turbine 100 shown in FIG. 1. FIG. 3 is a perspective view of a portion of tower climb assist assembly 130. Ladder 122 extends from supporting surface 104 to a platform 136 located a first distance 138 from supporting surface 104. In the exemplary embodiment, platform 136 is located within nacelle 106, such that ladder 122 extends within cavity 120 between supporting surface 104 and nacelle 106. In an alternative embodiment, ladder 122 is coupled to an exterior of tower 102 and extends between supporting surface 104 and nacelle 106.

Climb assist assembly 130 includes a guide shaft 140, a first counterweight 142, a second counterweight 144, and a rigging system 146. Guide shaft 140 has an elongated body 150 that includes an inner surface 152 and an outer surface 154. In the exemplary embodiment, guide shaft 140 has a circular cross-section having a diameter $d_1$. In an alternative embodiment, guide shaft 140 has a non-circular cross-section. In one embodiment, guide shaft 140 is fabricated from a plastic material such as, but not limited to, a poly-vinyl-chloride (PVC) tubing, having diameter $d_1$ between approximately two and six inches. In another embodiment, guide shaft 140 has diameter $d_1$ of approximately three inches. Diameter $d_1$ is selected to facilitate balancing a plurality of characteristics, such as, material strength, material stability, material cost, and the diameter and weight of counterweights 142 and 144.

Guide shaft 140 includes a first end 156 and a second end 158. In the exemplary embodiment, guide shaft 140 extends substantially parallel to ladder 122 between first end 156 and second end 158. First and second ends 156 and 158 are separated by a second distance 160, and, in one embodiment, second distance 160 is greater than first distance 138 such that climb assist assembly 130 facilitates assisting first and second climbers 132 and 134 for the entire length of ladder 122. In the exemplary embodiment, first and second counterweights 142 and 144 are positioned within guide shaft 140 and guide shaft 140 facilitates aligning counterweights 142 and 144 in a vertical direction. Guide shaft 140 also facilitates protecting counterweights 142 and 144 from obstructions as counterweights 142 and 144 travel through guide shaft 140. In one embodiment, to facilitate reducing damage to system, guide shaft 140 includes a hole (not shown) located proximate to guide shaft second end 158. The hole allows air to flow within guide shaft 140 as counterweights 142 and 144 travel therein. If either counterweight 142 and/or 144 were to fall, a compressed air column would form below counterweight 142 and/or 144 to slow the rate of fall.

In an alternative embodiment, more than one guide shaft 140 may be provided, such that first counterweight 142 is positioned within a first guide shaft (not shown) and second counterweight 144 is positioned within a second guide shaft (not shown). In another alternative embodiment, guide shaft 140 may be a guide cable, or a plurality of guide cables, that extends through a bore in each of first and second counterweights 142 and 144, such that counterweights 142 and 144 are free to move along the length of the guide cable. Alternatively, a plastic member may be sheathed around guide cable or extend through the counterweight bore to facilitate reducing friction and wear and to prevent counterweights 142 and 144 from following cable twist.

In the exemplary embodiment, each counterweight 142 and 144 includes a cylindrical body 170 having a length 172 and a diameter $d_2$ selected such that each counterweight 142 and 144 generates a gravitational force 174 in a direction of arrow A, that is generally parallel with ladder 122. Gravitational force 174 facilitates assisting first and second climbers 134 and 136 in ascending and descending ladder 122 by generating a lifting force 175 on first and second climbers 132 and 134 in a direction of arrow B, that is in a generally opposite direction as arrow A. Counterweights 142 and 144 are fabricated from a material that has a high weight to volume ratio, such as, but not limited to, a metallic material. In the exemplary embodiment, counterweight diameter $d_2$ is smaller than guide shaft diameter $d_1$, such that a gap 176 is formed between counterweight 142 or 144 and guide shaft inner surface 152, thereby facilitating ease of movement between guide shaft 140 and counterweights 142 and 144.

Rigging system 146 includes a first subsystem 178 and a second subsystem 179. Each subsystem 178 and 179 functions independently with respect to one another. Subsystems 178 and 179 each include at least one cable 180, at least one pulley 182, and at least one harness 184 for assisting climbers 132 and 134 in climbing ladder 122.

In the exemplary embodiment, first subsystem 178 includes a first cable 190, a first harness side pulley 194, a first counterweight side pulley 198, and a first harness 202. First harness 202 is utilized by first climber 132 to assist first climber 132 in ascending and descending ladder 122. Second subsystem 179 includes a second cable 192, a second harness side pulley 196, a second counterweight side pulley 200, and a second harness 204. Second harness 204 is utilized by second climber 134 to assist second climber 134 in ascending and descending ladder 122. In an alternative embodiment, subsystems 178 and 179 include more or less than two cables 180, pulleys 182, and/or harnesses 184.

Cables 180 are fabricated from a material that includes a high strength to weight ratio, such as, but not limited to, a galvanized metal material. A first end 210 of first cable 190 is coupled to first counterweight 142, and a first end 214 of second cable 192 is coupled to second counterweight 144. A second end 212 of first cable 190 is coupled to first harness 202, and a second end 216 of second cable 192 is coupled to second harness 204. In the exemplary embodiment, a safety device (not shown), for example, a lanyard, is utilized to connect or disconnect a climber from ladder 122. In another embodiment, the safety device is utilized while the climber is climbing ladder 122.

Pulleys 182 are coupled to a first wall 220 positioned at the top of tower 102. First wall 220 is located a third distance 222 from platform 136. In the exemplary embodiment, first wall is located third distance 222 generally vertically above platform 136. In use, cables 180 extend over pulleys 182 from counterweights 142 and 144 to harnesses 202 and 204, respectively. Pulleys 182 facilitate changing the direction of the forces of counterweights 142 and 144 and climbers 132 and 134 and also facilitate transferring the forces between counterweights 142 and 144 and climbers 132 and 134, respectively. In the exemplary embodiment, rigging system 146 includes four pulleys 182. Specifically, rigging system 146 includes first harness side pulley 194, second harness side pulley 196, first counterweight side pulley 198, and second counterweight side pulley 200. Accordingly, each subsystem 178 and 179 utilizes a dual pulley arrangement such that each cable 180 extends from one of counterweights 142, 144 to one of counterweight side pulleys 194, 196, then to one of harness side pulleys 198, 200, and then to the respective harness 184. Each subsystem 178 and 179 operates independently of the other subsystem 178 or 179 such that pulleys 194 and 198 operate independently of pulleys 196 and 200. In an alternative embodiment, rigging system 146 includes more or less than four pulleys 182.

In the exemplary embodiment of rigging system 146, first cable 190 extends in the direction of arrow B between first counterweight 142 and first counterweight side pulley 194. First cable 190 then extends in the direction of an arrow C, that is generally perpendicular to arrow B, for a distance 240 to first harness side pulley 198. In the exemplary embodiment, first harness side pulley 198 is generally vertically above ladder 122. First cable 190 then extends in the direction of arrow A, that is generally perpendicular to arrow C and opposed to the direction of arrow B, and is coupled to first harness 202 at cable second end 214. In an alternative embodiment, cable second end 214 is coupled to a safety device (not shown), such as, but not limited to, a lanyard, that is operatively coupled to first harness 202. Safety device is then coupled to ladder 122 to facilitate securing first counterweight 142 from moving when rigging system 146 is not in use, or to secure first climber 132 to ladder 122.

Moreover, in the exemplary embodiment, rigging system 146 is further physically configured such that second cable 192 extends in the direction of arrow B between second counterweight 144 and second counterweight side pulley 200. Second cable 192 then extends in the direction of arrow C for a distance 242 to second harness side pulley 196. In the exemplary embodiment, second harness side pulley 198 is generally vertically above ladder 122. In the exemplary embodiment distances 240 and 242 are substantially equal. Second cable 192 then extends in the direction of arrow A and is coupled to second harness 204 at cable second end 216. In an alternative embodiment, cable second end 216 is coupled to a safety device (not shown), such as, but not limited to, a lanyard, that is operatively coupled to second harness 204. Safety device is then coupled to ladder 122 to facilitate securing second counterweight 144 from moving when rigging system 146 is not in use, or to secure second climber 134 to ladder 122.

As illustrated in FIG. 3, guide shaft 140 houses counterweights 142 and 144. In the exemplary embodiment, both counterweights 142 and 144 are positioned within guide shaft 140 such that first counterweight 142 is positioned generally vertically below, or in the direction of arrow A, with respect to second counterweight 144. As such, second counterweight 144 includes a bore 250 extending through second counterweight 144 from a first end 252 to a second end 254 of second counterweight 144. In the exemplary embodiment, bore 250 extends through the center of second counterweight 144. First cable 190 extends through bore 250 and is coupled to a first end 256 of first counterweight 142. Accordingly, first cable 190 and first counterweight 142 move independently with respect to second counterweight 144 and second cable 192. In an alternative embodiment, two guide shafts (not shown) are provided such that each counterweight 142 and 144 is located within a respective guide shaft and each is free to move independently from the other counterweight.

In the exemplary embodiment, second counterweight 144 includes a casing 258 that lines bore 250 to facilitate preventing abrasion of first cable 190. In one embodiment, casing 258 is fabricated from a plastic material, such as, but not limited to, a poly-vinyl-chloride (PVC) tubing. Casing has a diameter $d_3$ that is larger than the thickness of first cable 190, and smaller than second counterweight diameter $d_2$. Moreover, in the exemplary embodiment, first and second counterweights 142 and 144 have beveled edges to facilitate ease of travel within guide shaft 140.

In the exemplary embodiment second cable 192 is coupled to second counterweight 144 at an attachment point 260 a distance 262 from a center of second counterweight 144 because bore 250 extends through the center of second counterweight 144. In order to compensate for this off-set mounting, in the exemplary embodiment, second counterweight 144 includes a notched out portion 264 in a portion 266 of a sidewall 268 of second counterweight 144 to substantially align the center of mass of second counterweight 144 with attachment point 260. Notch out portion 264 facilitates substantially aligning the center of gravity of second counterweight 144 with attachment point 260. Accordingly, second counterweight 144 travels smoothly within guide shaft 140. In an alternative embodiment, to compensate for the off-set mounting, second counterweight 144 is fabricated from a plurality of materials such that second counterweight center of gravity is substantially aligned below attachment point 260. In another alternative embodiment, second counterweight 144 is fabricated with additional material or weight located on second counterweight 144 such that second counterweight is balanced about attachment point 260.

As described above, climb assist assembly 130 facilitates assisting multiple climbers, such as first and second climbers 132 and 134, in ascending and descending tower 102. In the exemplary embodiment, as a safety precaution, climb assist assembly 130 is designed to be utilized by one climber at a time. In use, first climber 132 couples first cable 190 to first harness 202 and then first climber 132 ascends ladder 122 to platform 136. As first climber 132 is ascending ladder 122 in the direction of arrow B, first counterweight 142 moves in the direction of arrow A within guide shaft 140. As first counterweight 142 moves in the direction of arrow A, second end 214 of first cable 190 moves in the direction of arrow B thereby assisting first climber 132 in ascending ladder 122. Once first climber 132 reaches platform 136, second climber 134 couples second cable 192 to second harness 204 and then second climber 134 ascends ladder 122 to platform 136. As second climber 134 is ascending ladder 122 in the direction of arrow B, second counterweight 144 moves in the direction of arrow A within guide shaft 140. As second counterweight 144 moves in the direction of arrow A, second end 216 of second cable 192 moves in the direction of arrow B thereby assisting second climber 134 in ascending ladder 122.

In order to descend ladder 122, second climber 134 must descend before first climber 132, as second counterweight 144 is positioned generally vertically above first counterweight 142, or in the direction of arrow B, with respect to first counterweight 142 within guide shaft 140. Accordingly, second climber 134 descends ladder 122, and then first climber 132 descends ladder 122. As climbers 132 and 134 are descending in the direction of arrow A, the respective counterweights 142 and 144 are moving in the direction of arrow B within guide shaft 140. However, gravitational force 174 of counterweights 142 and 144 remains in the direction of arrow A and the lifting force 175 remains in the direction of arrow B providing a resistance to the climbers 132 and 134 as the climbers 132 and 134 are descending the ladder 122. The resistance provided by counterweights 142 and 144 facilitates assisting climbers 132 and 134 in descending ladder 122 and also facilitates preventing climbers 132 and 134 from falling.

In an exemplary embodiment, climb assist assembly 130 includes a variety of safety devices. In one embodiment, a safety lanyard 270 is coupled to second counterweight first end 252 so that second climber 134 can begin to ascend ladder 122 when first climber 132 is located at platform 136 and removes safety lanyard 270. In another embodiment, a pin (not shown) is inserted through guide shaft 140 to retain second counterweight 144 in place until the pin is removed by first climber 132 at platform 136. In a further embodiment, a plurality of viewing windows (not shown) are placed in guide shaft 140 to facilitate viewing of first and/or second cables 190 and/or 192 to determine an operating condition of cables for repair or replacement.

Figure 4:
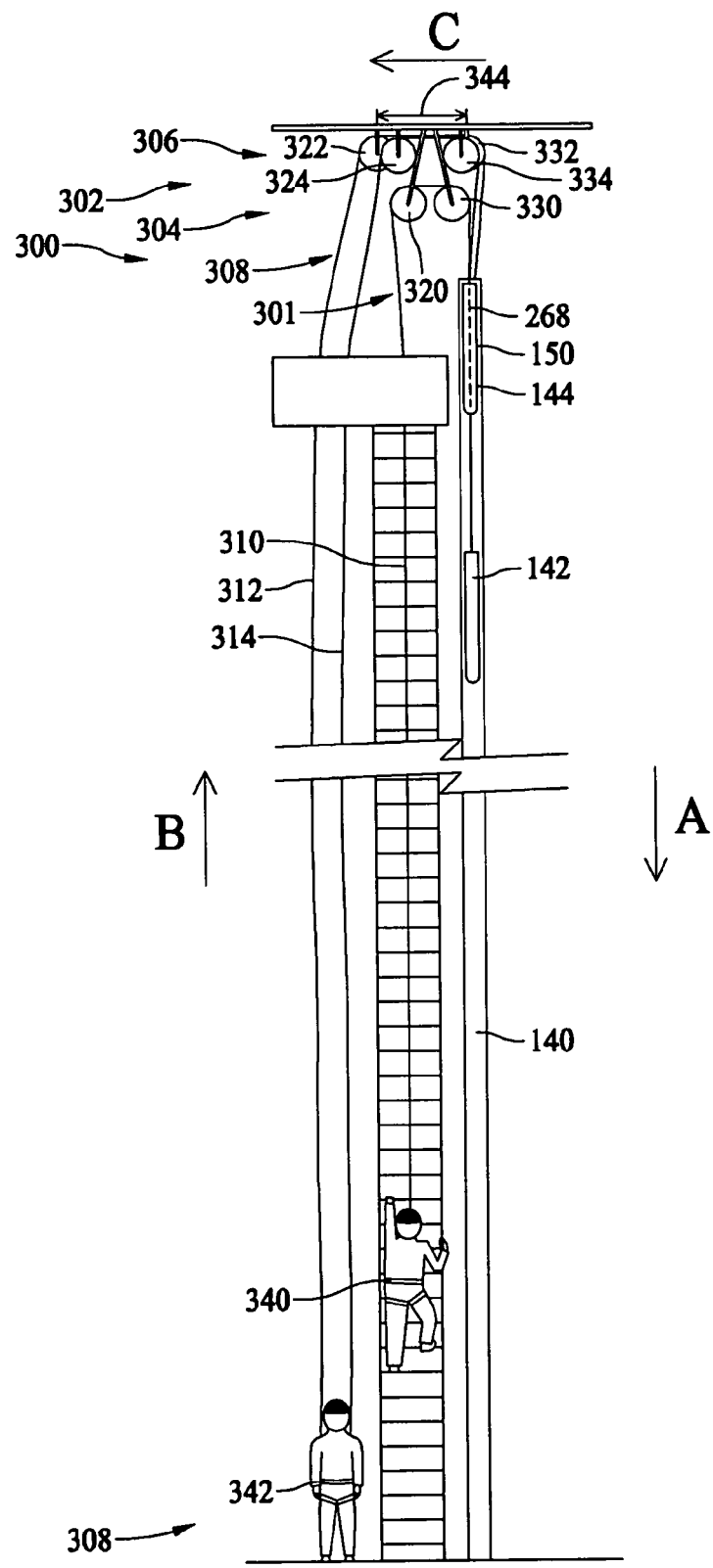
FIG. 4 is a front elevational view of another exemplary tower climb assist assembly that can be used with the wind turbine shown in FIG. 1.

FIG. 4 is a front elevational view of an alternative climb assist assembly 300 in which common elements of climb assist assemblies 130 and 300 are numbered with like reference characters. Climb assist assembly 300 includes guide shaft 140, first and second counterweights 142 and 144 and a rigging system 302. Rigging system 302 includes a first subsystem 301 and a second subsystem 303. Each subsystem 301 and 303 includes at least one cable 304, at least one pulley 306, and at least one harness 308. In the exemplary embodiment, first subsystem 301 includes a first cable 310, a first harness side pulley 320, a first counterweight side pulley 330, and a first harness 340 which, in one embodiment, is substantially similar to first or second harnesses 202 and 204 shown in FIG. 2. First cable 310 is coupled to first counterweight 142 and first harness 340 via first counterweight side and first harness side pulleys 330 and 320, respectively, in a similar manner as in climb assist assembly 130 shown in FIG. 2.

Moreover, in the exemplary embodiment, second subsystem 303 includes a second cable 312, a third cable 314, a second harness side pulley 322, a third harness side pulley 324, a second counterweight side pulley 332, a third counterweight side pulley 334, and a second harness 342 which is substantially similar to first and second harnesses 202 and 204 shown in FIG. 2. Second and third cables 312 and 314 are coupled to second counterweight 144. In the exemplary embodiment, second and third cables 312 and 314 are coupled to second counterweight 144 adjacent second counterweight sidewall 268, thereby allowing first cable 310 to extend through bore 250 in the center of second counterweight 144. Accordingly, notched out portion 264, included in climb assist assembly 130 shown in FIG. 2, is not required because second counterweight 144 remains substantially aligned with guide shaft 140 as the center of mass of second counterweight 144 is substantially centered about the central axis of second counterweight 144.

In the exemplary embodiment, second cable 312 extends in the direction of arrow B from second counterweight 144 to second counterweight side pulley 332. Second cable 312 then extends in the direction of arrow C for a distance 344 to second harness side pulley 322 such that second cable 312 is positioned in the direction of arrow B with respect to ladder 122. Second cable 312 then extends in the direction of arrow A and is coupled to second harness 342. Third cable 314 extends in the direction of arrow B from second counterweight 144 to third counterweight side pulley 334. Third cable 314 then extends in the direction of arrow C for distance 344 to third harness side pulley 324 such that third cable 314 is positioned in the direction of arrow B with respect to ladder 122. Third cable 314 then extends in the direction of arrow A and is coupled to second harness 342. Due to the use of third cable 314 and the additional pulleys 306, second and third cables 312 and 314 are fabricated, in one embodiment, from a cable having a smaller diameter than second cable 192 (shown in FIG. 2) which facilitates lowering the cost of climb assist assembly 300. In an alternative embodiment, cables 312 and 314 are fabricated from a cable having a lower weight capacity than second cable 192 (shown in FIG. 2) which facilitates lowering the cost of climb assist assembly 300.

The above-described climb assist assembly for climbing a structure, such as a wind turbine, is fabricated in a cost-effective and reliable manner. The climb assist assembly includes multiple cables and counterweights to facilitate assisting multiple climbers in ascending and descending the structure. Specifically, the climb assist assembly includes two counterweights moveable relative to each other so that the first counterweight assists the first climber and the second counterweight assists the second climber. As a result, the climb assist assembly facilitates allowing multiple service personnel to access the working components of the wind turbine in a reliable and cost-effective manner.

Exemplary embodiments of climb assist assemblies are described above in detail. The assemblies are not limited to the specific embodiments described herein, but rather, components of each assembly may be utilized independently and separately from other components described herein. For example, each climb assist assembly component can also be used in combination with other climb assist assembly components.

While the invention has been described in terms of various specific embodiments, those skilled in the art will recognize that the invention can be practiced with modification within the spirit and scope of the claims.

What is claimed is:

1. A method for assisting multiple climbers in ascending and descending the same ladder using an apparatus including a plurality of counterweights and a rigging system coupled to the counterweights, the rigging system includes at least two subsystems, each subsystem includes at least one cable, at least one pulley, and at least one harness, said method comprises:

configuring a first subsystem to assist a first climber in ascending and descending the ladder by coupling a first harness to the first climber and connecting a first end of each first subsystem cable to a first counterweight;

configuring a second subsystem to assist a second climber in ascending and descending the ladder by coupling a second harness to the second climber and connecting a first end of each second subsystem cable to a second counterweight;

using the first subsystem to assist the first climber in ascending the ladder;

using the second subsystem to assist the second climber in ascending the ladder prior to the first climber descending the ladder;

using the second subsystem to assist the second climber in descending the ladder prior to the first climber descending the ladder;

using the first subsystem to assist the first climber in descending the ladder; and providing a single guide shaft, wherein the first and second counterweights are located within the guide shaft.

2. A method in accordance with claim 1 wherein configuring the first subsystem further comprises:

extending a second end of each first subsystem cable through at least one first subsystem pulley; and connecting the second end of each first subsystem cable to the first harness;

wherein configuring the second subsystem further comprises:

extending a second end of each second subsystem cable through at least one second subsystem pulley; and connecting the second end of each second subsystem cable to the second harness.

3. A method in accordance with claim 1 wherein the first and second counterweights are moveable relative to one another in a generally vertical direction.

4. A method in accordance with claim 3 further comprising positioning the first counterweight in the guide shaft vertically below the second counterweight.

5. A method in accordance with claim 4 wherein positioning the first counterweight vertically below the second counterweight further comprises:

providing a bore through the second counterweight; and extending the first subsystem cable through the bore such that the first cable is moveable relative to the second counterweight.

6. A method in accordance with claim 1 further comprising assisting the first climber and the second climber in ascending and descending the ladder by moving the first subsystem and the second subsystem relative to one another.

7. A method in accordance with claim 1 wherein using the first subsystem to assist the first climber in ascending and descending the ladder further comprises at least one of moving the first counterweight in a vertically downward direction, thereby moving the first harness in a vertically upward direction and moving the first harness in a vertically downward direction, thereby moving the first counterweight in a vertically upward direction, and wherein using the second subsystem to assist the second climber in ascending and descending the ladder further comprises at least one of moving the second counterweight in a vertically downward direction, thereby moving the second harness in a vertically upward direction and moving the second harness in a vertically downward direction, thereby moving the second counterweight in a vertically upward direction.

8. A method for assisting multiple climbers in ascending and descending the same ladder using an apparatus including a plurality of counterweights and a rigging system coupled to the counterweights, the rigging system includes at least two subsystems, each subsystem includes at least one cable, at least one pulley, and at least one harness, said method comprises:

configuring a first subsystem to assist a first climber in ascending and descending the ladder by coupling a first harness to the first climber and connecting a first end of each first subsystem cable to a first counterweight;

configuring a second subsystem to assist a second climber in ascending and descending the ladder by coupling a second harness to the second climber and connecting a first end of each second subsystem cable to a second counterweight; and positioning at least one of the first subsystem cables through a bore defined in the second counterweight of the second subsystem.

9. A method in accordance with claim 8 wherein configuring the first subsystem further comprises:

extending a second end of each first subsystem cable through at least one first subsystem pulley; and connecting the second end of each first subsystem cable to the first harness;

wherein configuring the second subsystem further comprises:

extending a second end of each second subsystem cable through at least one second subsystem pulley; and connecting the second end of each second subsystem cable to the second harness.

10. A method in accordance with claim 9 further comprising providing at least one guide shaft, wherein the first and second counterweights are located within the guide shaft.

11. A method in accordance with claim 8 wherein the first and second counterweights are moveable relative to one another in a generally vertical direction.

12. A method in accordance with claim 11 further comprising positioning the first counterweight in a guide shaft vertically below the second counterweight.

13. A method in accordance with claim 12 wherein positioning the first counterweight vertically below the second counterweight further comprises extending the first subsystem cable through the bore such that the first cable is moveable relative to the second counterweight.

14. A method in accordance with claim 8 further comprising assisting the first climber and the second climber in ascending and descending the ladder by moving the first subsystem and the second subsystem relative to one another.

15. A method in accordance with claim 8 wherein using the first subsystem to assist the first climber in ascending and descending the ladder further comprises at least one of moving the first counterweight in a vertically downward direction, thereby moving the first harness in a vertically upward direction and moving the first harness in a vertically downward direction, thereby moving the first counterweight in a vertically upward direction, and wherein using the second subsystem to assist the second climber in ascending and descending the ladder further comprises at least one of moving the second counterweight in a vertically downward direction, thereby moving the second harness in a vertically upward direction and moving the second harness in a vertically downward direction, thereby moving the second counterweight in a vertically upward direction.

16. A method in accordance with claim 8 further comprising:

using the first subsystem to assist the first climber in ascending the ladder;

using the second subsystem to assist the second climber in ascending the ladder prior to the first climber descending the ladder;

using the second subsystem to assist the second climber in descending the ladder prior to the first climber descending the ladder; and using the first subsystem to assist the first climber in descending the ladder.

17. A method for assisting multiple climbers in ascending and descending the same ladder using an apparatus including a plurality of counterweights and a rigging system coupled to the counterweights, the rigging system includes at least two subsystems, each subsystem includes at least one cable, at least one pulley, and at least one harness, said method comprises:

configuring a first subsystem to assist a first climber in ascending and descending the ladder by coupling a first harness to the first climber;

configuring a second subsystem to assist a second climber in ascending and descending the ladder by coupling a second harness to the second climber;

configuring the first subsystem to prevent the first climber from descending the ladder prior to the second climber descending the ladder; and providing a single guide shaft, wherein the first and second counterweights are located within the guide shaft.

18. A method in accordance with claim 17 wherein configuring the first subsystem further comprises:

connecting a first end of each first subsystem cable to a first counterweight;

extending a second end of each first subsystem cable through at least one first subsystem pulley; and connecting the second end of each first subsystem cable to the first harness;

wherein configuring the second subsystem further comprises:

connecting a first end of each second subsystem cable to a second counterweight;

extending a second end of each second subsystem cable through at least one second subsystem pulley; and connecting the second end of each second subsystem cable to the second harness.

19. A method in accordance with claim 17 wherein configuring a first subsystem further comprises connecting a first subsystem cable to a first counterweight, and wherein configuring a second subsystem further comprises connecting a second subsystem cable to a second counterweight, wherein the first and second counterweights are moveable relative to one another in a generally vertical direction.

20. A method in accordance with claim 19 further comprising positioning the first counterweight in a guide shaft vertically below the second counterweight.

21. A method in accordance with claim 20 wherein positioning the first counterweight vertically below the second counterweight further comprises:

providing a bore through the second counterweight; and extending the first subsystem cable through the bore such that the first cable is moveable relative to the second counterweight.

22. A method in accordance with claim 17 further comprising assisting the first climber and the second climber in ascending and descending the ladder by moving the first subsystem and the second subsystem relative to one another.

* * * * *